United States Patent [19]

Leuthen

[11] Patent Number: 5,220,494
[45] Date of Patent: Jun. 15, 1993

[54] PROTECTION CIRCUIT AND METHOD FOR VARIABLE SPEED DRIVES UTILIZING PHASE CONTROLLED CONVERTERS

[75] Inventor: John M. Leuthen, Claremore, Okla.

[73] Assignee: Baker Hughes Incorporated, Houston, Tex.

[21] Appl. No.: 830,307

[22] Filed: Jan. 31, 1992

[51] Int. Cl.$^5$ ................ H02H 7/127; H02M 7/162
[52] U.S. Cl. .......................... 363/37; 361/111; 363/54
[58] Field of Search ............... 361/91, 111; 363/37, 363/52-54, 87; 318/803

[56] References Cited

U.S. PATENT DOCUMENTS

| | | | |
|---|---|---|---|
| 4,589,050 | 5/1986 | Cutler et al. | 363/54 |
| 4,815,052 | 3/1989 | Walker | 363/87 |
| 4,843,533 | 6/1989 | Roof et al. | 363/55 |
| 5,038,244 | 8/1991 | Tuusa | 361/56 |

Primary Examiner—William H. Beha, Jr.
Attorney, Agent, or Firm—James E. Bradley

[57] ABSTRACT

A method and circuit for detecting rapid increase in line voltages applied to variable speed drives utilizing a phase controlled converter. A three phase alternating current line voltage is applied to a full wave bridge rectifier to generate a direct current signal. A buffer amplifier having a high input impedance is coupled to the output of the rectifier and a diode is utilized to ensure that only positive voltage transients are detected. Positive voltage transients output through the buffer amplifier rapidly charge a capacitor through the low output impedance of the buffer amplifier and that charge is permitted to bleed off slowly through an associated resistor. The rate of change of the capacitor charge level is compared to a preset voltage level and increases beyond that preset level are utilized to trigger an inhibit signal which momentarily resets the delay angle of the switching devices within the phase controlled converter. In this manner, a rapid increase in the average slope of the input line voltage, whether or not preceded by a decrease, may be detected and removed from the input of a variable speed drive.

8 Claims, 3 Drawing Sheets

PROTECTION CIRCUIT AND METHOD FOR VARIABLE SPEED DRIVES UTILIZING PHASE CONTROLLED CONVERTERS

BACKGROUND OF THE INVENTION

1. Field of the Invention

The present invention relates in general to electronic circuitry for detecting rapid increases in line voltages and in particular to electronic circuitry for detecting rapid increases in line voltages despite a preceding decrease in line voltage. Still more particularly, the present invention relates to circuitry for detecting and eliminating rapid increases in line voltages applied to variable speed drives utilizing a phase controlled converter.

2. Description of the Prior Art

Variable speed drive systems are well known in the prior art. Such systems typically utilize three phase alternating current (AC) power which is rectified and utilized to create a direct current (DC) bus having a positive and negative rail. Phase controlled switching devices, such as silicon controlled rectifiers (SCR's), are generally utilized to vary the amount of power within the rectified signal by altering the phase angle at which the switching device operates. By selectively controlling the firing signal applied to the gates of these SCR's the amount of power passed to the DC bus may be accurately controlled.

In an alternating current (AC) drive systems inverter circuits are then typically utilized to create a variable frequency alternating current signal from the DC bus, which may be utilized to control a variable speed motor or other such device. Voltage controlled oscillators are generally utilized to generate inverter gate signals which may be utilized to selectively vary the frequency of the output signal, effectively controlling the frequency of operation of a motor or other load device. Of course, in a direct current (DC) drive system an inverter circuit will not be necessary.

As those skilled in the art will appreciate, the voltage level applied to the switching devices in such a circuit must be accurately controlled to avoid damage to the switching devices. Voltage regulation circuits are well known in the art and typically involve circuits which are utilized to "scrub" excess voltage when the line voltage exceeds a preselected level. A problem exists with such voltage regulation circuits in their inability to detect and respond to rapid increases in line voltage, particularly in situations in which the line voltage first "sags" and then rapidly increases.

It is therefore one object of the present invention to provide a protection circuit for use with variable speed drives utilizing phase controlled converters which can be utilized to detect and eliminate rapid increases in line voltages.

SUMMARY OF THE INVENTION

It is therefore one object of the present invention to provide an improved electronic circuit for detecting rapid increases in line voltages.

It is another object of the present invention to provide an improved electronic circuit for detecting rapid increases in line voltages despite a preceding decrease in line voltage.

It is yet another object of the present invention to provide an improved electronic circuit for detecting rapid increases in line voltages which are applied to variable speed drives utilizing a phase controlled converter.

The foregoing objects are achieved as is now described. A three phase alternating current line voltage is applied to a full wave bridge rectifier to generate a direct current signal. A buffer amplifier having a high input impedance is coupled to the output of the rectifier and a diode is utilized to ensure that only positive voltage transients are detected. Positive voltage transients output through the buffer amplifier rapidly charge a capacitor through the low output impedance of the buffer amplifier and that charge is permitted to bleed off slowly through an associated resistor. The rate of change of the capacitor charge level is compared to a preset voltage level and increases beyond that preset level are utilized to trigger an inhibit signal which momentarily resets the delay angle of the switching devices within the phase controlled converter. In this manner, a rapid increase in the average slope of the input line voltage, whether or not preceded by a decrease, may be detected and removed from the input of a variable speed drive.

Additional objects, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
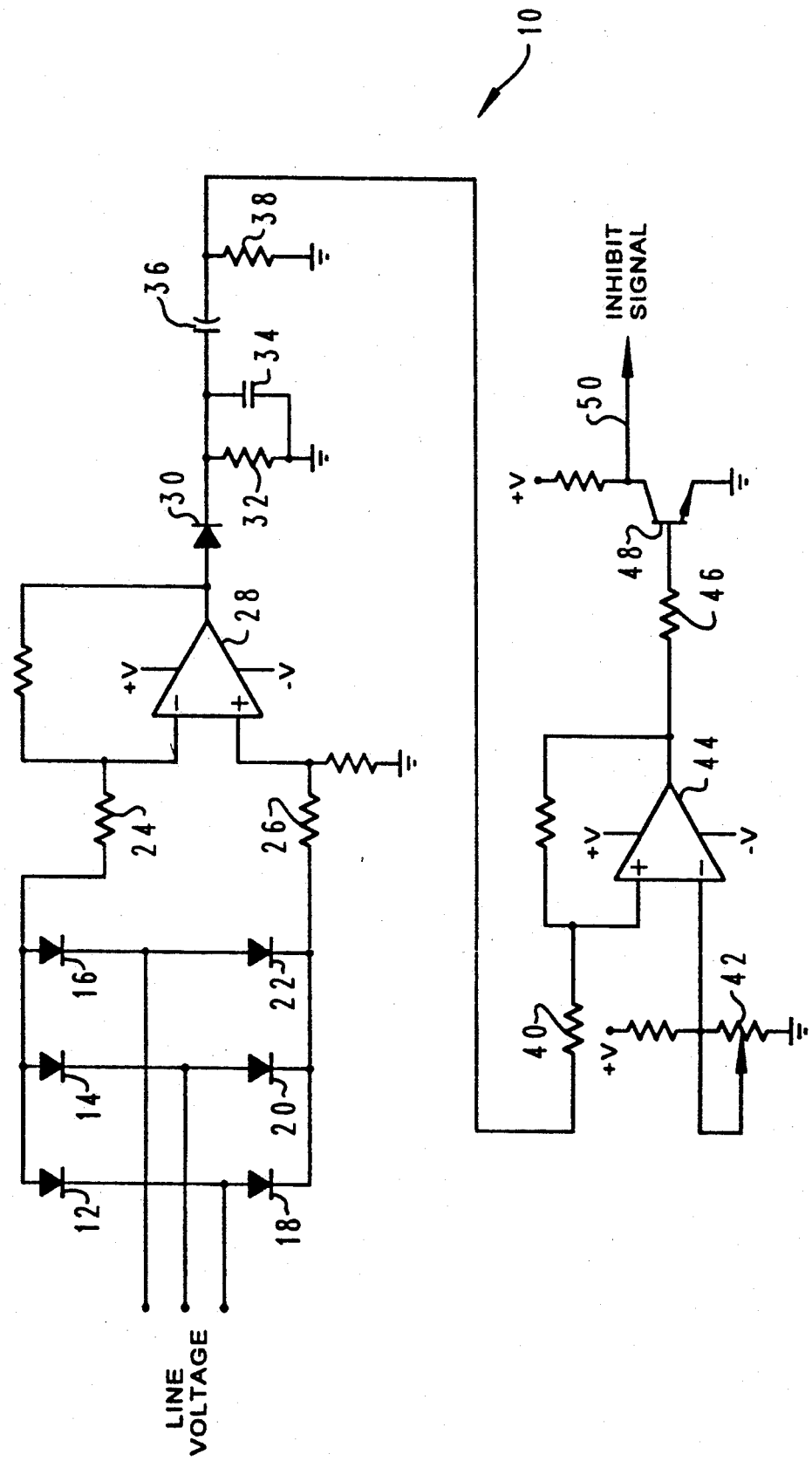
FIG. 1 is a schematic diagram of the protection circuit of the present invention.

With reference now to the figures and in particular with reference to FIG. 1, there is depicted a schematic diagram of the protection circuit 10 of the present invention. As depicted, three phase alternating current power is applied to a full wave bridge rectifier formed by diodes 12, 14, 16, 18, 20, and 22. The output of this rectifier is the applied, via resistors 24 and 26, to buffer amplifier 28. Buffer amplifier 28 is preferably utilized to provide a high input impedance on the output from the rectifier.

As depicted, the output of buffer amplifier 28 is coupled to diode 30. Diode 30 is utilized, in the depicted embodiment of the present invention, to ensure that only positive voltage transients in the line voltage are measured. Thus, as long as the line voltage remains constant, the voltage at the cathode of diode 30 will be relatively steady voltage.

As an increase in line voltage occurs, capacitor 30 will rapidly charge through diode 30 and buffer amplifier 28. As the output impedance of buffer amplifier 28 is approximately fifty ohms, the limiting time constant for the charging of capacitor 34 would be approximately fifty microseconds. Alternately, a decrease in line voltage permits capacitor 34 to discharge through resistor 32. In the depicted embodiment of the present invention, resistor 32 is selected such that a discharge of capacitor 34 through resistor 32 occurs with a time constant of approximately one hundred milliseconds. Thus, those skilled in the art will appreciate that capacitor 34 will rapidly charge in the presence of a positive voltage transient and thereafter, slowly discharge, as described.

Next, capacitor 36 and resistor 38 form a differentiation circuit which is utilized to differentiate the signal present on capacitor 34. The output of this circuit is applied via resistor 40 to comparator 44. As depicted within FIG. 1, one input of comparator 44 is adjustable, utilizing resistor 42, such that when the output of the differentiation circuit formed by capacitor 36 and resistor 38 exceeds a preselected slope, the output of comparator 44 will change state. The output of comparator 44 is then coupled, via resistor 46 to the base of transistor 48. Transistor 48 is utilized as an output buffer to generate an INHIBIT signal, at reference numeral 50. The INHIBIT signal is then utilized to phase back the switching devices in a phase controlled converter, prior to a damaging increase in DC bus voltage.

Figure 2:
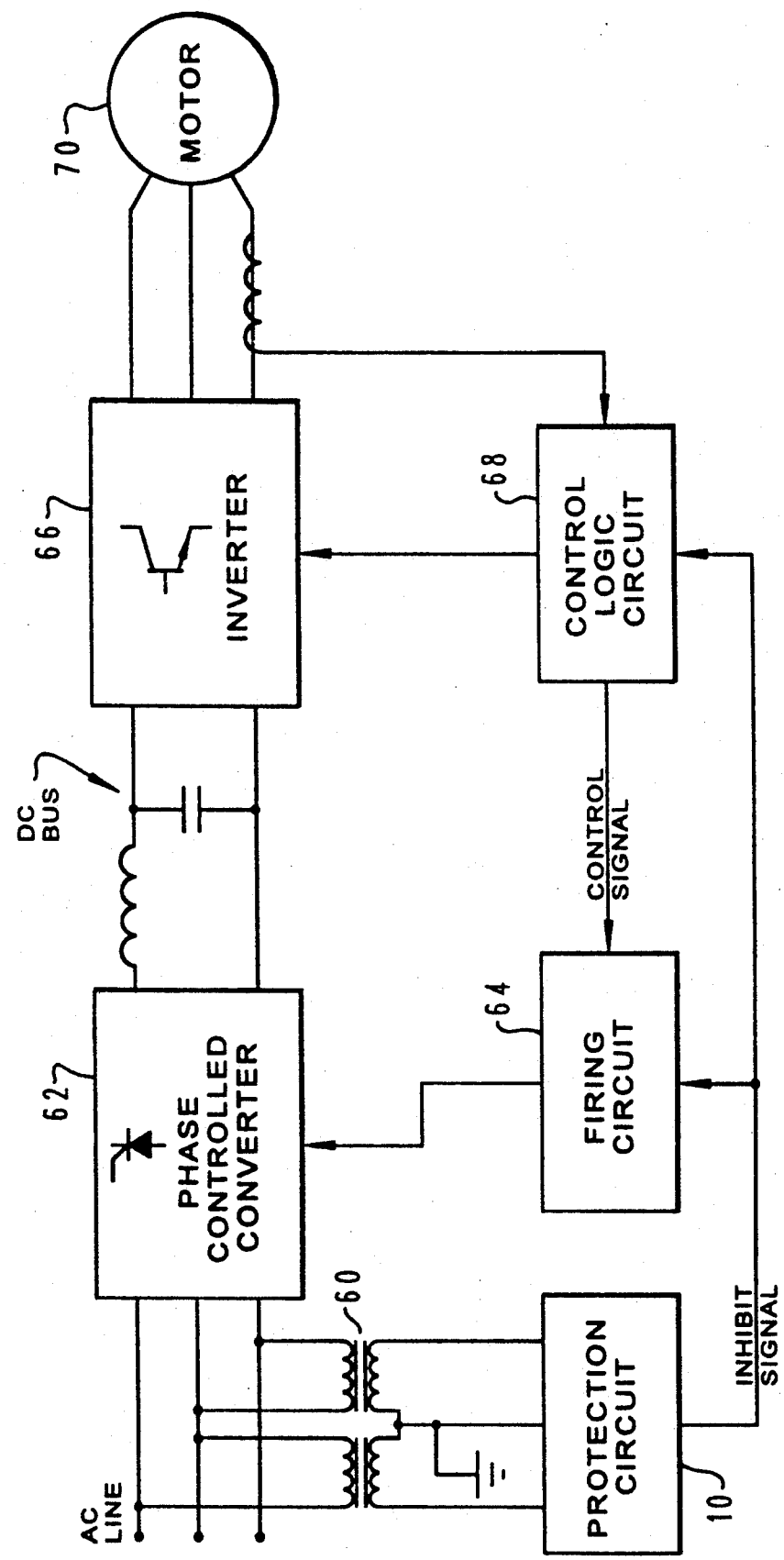
FIG. 2 is a block diagram of a variable speed drive circuit utilizing a phase controlled converter and the protection circuit of FIG. 1.

Referring now to FIG. 2, there is depicted a block diagram of a variable speed drive circuit utilizing a phase controlled converter and the protection circuit of FIG. 1. As illustrated, a portion of the AC line voltages coupled, via transformer 60, to protection circuit 10. As described with respect to FIG. 1, in the event a rapid increase in line voltage occurs, protection circuit 10 generates an INHIBIT signal which is coupled to firing circuit 64 and control logic 68.

Referring again to the AC line voltage, that voltage is coupled to phase controlled converter 62, which preferably includes a plurality of silicon controlled rectifiers (SCR's) or other switching devices. The operation of these switching devices is preferably controlled by firing circuit 64 in a manner well known in the art. One example of a firing circuit for a phase controlled converter may be seen in U.S. Pat. No. 4,598,353; however, those skilled in the art will appreciate that many different firing circuits may be utilized to adjust the phase at which the switching devices operate, thus controlling the amount of power passed by phase controlled converter 62 to the DC bus.

Next, in the alternating current (AC) drive depicted, the DC bus is coupled to inverter circuit 66. Inverter circuit 66 is preferably utilized to convert the DC bus voltage to a variable frequency AC signal, in response to a speed demand signal, in a manner well known in the art. Those skilled in the art will appreciate that such circuits typically utilize a voltage controlled oscillator to vary an output frequency to match an output voltage. Control logic circuit 68 is preferably utilized to generate the required inverter gate signals to inverter 66 and a control signal to firing circuit 64, in a manner well known in the art. Thus, the speed of motor 70 may be accurately varied by providing a variable frequency output from inverter 66 in the manner depicted. Of course, as set forth above, an inverter circuit is not necessary in a direct current (DC) drive.

Figure 3A:
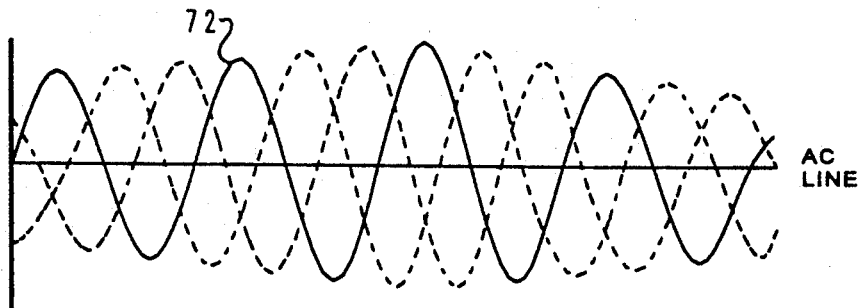
FIGS. 3a–3e depict various voltage waveforms at selected points within the block diagram of FIG. 2.
Figure 3B:
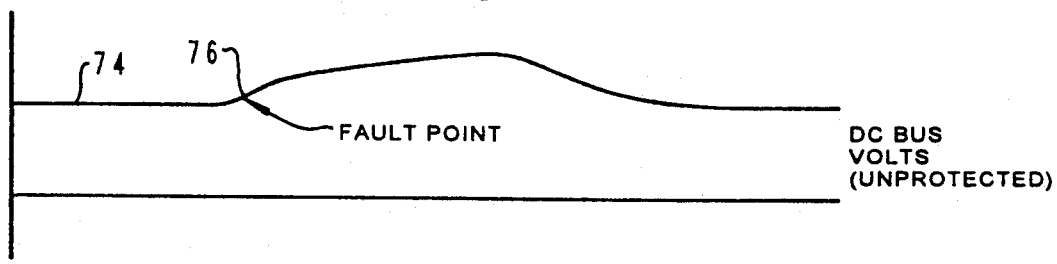

With reference now to FIGS. 3a-3e, there are depicted various voltage waveforms at selected points within the block diagram of FIG. 2. First, FIG. 3a depicts a three phase AC line signal which, as depicted, exhibits a sudden increase in voltage at reference numeral 72. FIG. 3b depicts the DC bus voltage present at the output of phase controlled converter 62 in an unprotected circuit. As seen, the DC bus level 74 increases rapidly at a point near 76 in response to the rapid increase in AC line voltage, until a fault point occurs.

Figure 3C:
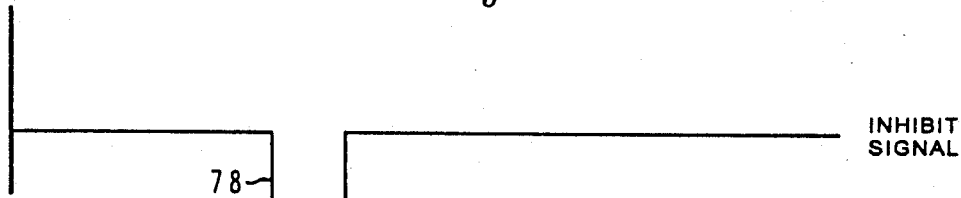

Next, with reference to FIG. 3c, and INHIBIT signal generated at the output of transistor 48 (see FIG. 1) is depicted. As described with respect to FIG. 1, a rapid increase in line voltage will, in the manner depicted, generate a momentary INHIBIT signal such as the pulse depicted at reference numeral 78 within FIG. 3c. This INHIBIT signal is, as depicted within FIG. 2, preferably applied to firing circuit 64 and control logic circuit 68 to phase back the firing point of the switching devices within phase controlled converter 62 while ramping the output of control logic circuit 68 back to a low demand voltage.

Figure 3D:
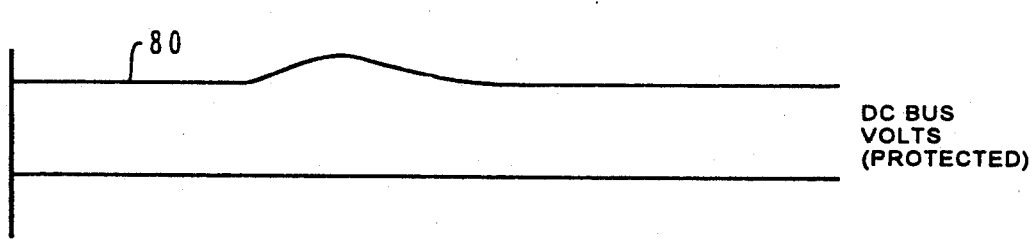
Figure 3E:
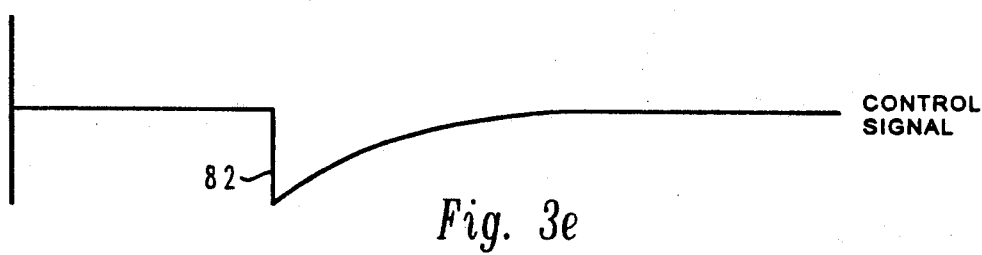

Thus, FIG. 3d depicts the output of phase controlled converter 62, the DC bus voltage, when utilizing the protection circuit of the present invention. As illustrated, after a slight increase in DC bus voltage 80, the effect of the INHIBIT signal can be seen to remove most of the transients from the DC bus, thus protecting inverter circuit 66. Finally, FIG. 3e depicts the control signal output from control logic circuit 68 to firing circuit 64 in response to the application of the INHIBIT signal. The switching device delay angle is rapidly changed in response to the presence of the INHIBIT signal and then slowly returns to the preset delay angle as the positive voltage transient diminishes.

Upon reference to the foregoing those skilled in the art will appreciate that the protection circuit of the present invention provides a circuit and method whereby rapid increases in AC line voltage may be detected and minimized by temporarily and selectively inhibiting a phase controlled converter to remove most of the voltage transient from the resultant DC bus. In this manner, inverter circuit 66 may be protected in a rapid and efficient manner.

While the invention has been shown in only one of its forms, it is not thus limited but is susceptible to various changes and modifications without departing from the spirit thereof.

What is claimed is:

1. A protection circuit (for detecting rapid increases in line voltages applied to variable speed drives utilizing a phase controlled converter,) said protection circuit comprising:

rectifier means for rectifying an applied input line voltage;

polarity limitation means coupled to an output of said rectifier means for permitting transmittal of positive voltage transients;

charge accumulation means coupled to said polarity limitation means for rapidly accumulating a voltage charge in response to a positive voltage transient and slowly discharging that charge in the absence of a positive voltage transient; and control means coupled to said charge accumulation means for coupling a momentary inhibit signal to said phase controlled converter in response to an increase in a rate of change of said voltage charge.

2. The protection circuit for detecting rapid increases in line voltage applied to variable speed drives utilizing a phase controlled converter according to claim 1, wherein said rectifier means comprises a full-wave diode bridge rectifier.

3. The protection circuit for detecting rapid increases in line voltage applied to variable speed drives utilizing a phase controlled converter according to claim 2, further including a buffer amplifier coupled to an output of said full-wave diode bridge rectifier.

4. The protection circuit for detecting rapid increases in line voltage applied to variable speed drives utilizing a phase controlled converter according to claim 3, wherein said polarity limitation means comprises a diode coupled to an output of said buffer amplifier.

5. The protection circuit for detecting rapid increases in line voltage applied to variable speed drives utilizing a phase controlled converter according to claim 4, wherein said charge accumulation means comprises a capacitor coupled to said diode.

6. The protection circuit for detecting rapid increases in line voltage applied to variable speed drives utilizing a phase controlled converter according to claim 5, wherein said control means comprises a differentiator circuit coupled to said capacitor and a comparator circuit which changes output state each time an output of said differentiator circuit exceeds a predetermined level.

7. The protection circuit for detecting rapid increases in line voltage applied to variable speed drives utilizing a phase controlled converter according to claim 6, further including switch means coupled to an output of said comparator circuit for coupling a momentary inhibit signal to said phase controlled converter in response to a change in output state of said comparator circuit.

8. A method for protection from rapid increases in line voltages for use in variable speed drives utilizing a phase controlled converter, said method comprising the steps of:
rectifying an input line voltage applied to said variable speed drive;
detecting only positive voltage transients in said rectified input line voltage;
providing a charge accumulation means for rapidly accumulating a voltage charge in response to a positive voltage transient and slowly discharging that charge in the absence of a positive voltage transient;
generating a momentary inhibit signal in response to an increase in a rate of change of said voltage charge; and
applying said momentary inhibit signal to said phase controlled converter.

* * * * *